US007796810B2

(12) United States Patent
Nadeau et al.

(10) Patent No.: US 7,796,810 B2
(45) Date of Patent: Sep. 14, 2010

(54) 3D BULLET AND CARTRIDGE CASE ANALYSIS

(75) Inventors: Eric Nadeau, Lachine (CA); Myriam Pages, Montréal (CA); Danny Roberge, St-Bruno (CA); Alain Roy, Lemoyne (CA); Martin Léger, St-Lazare (CA)

(73) Assignee: Forensic Technology Wai, Inc., Montreal (CA)

( * ) Notice: Subject to any disclaimer, the term of this patent is extended or adjusted under 35 U.S.C. 154(b) by 962 days.

(21) Appl. No.: 10/913,508

(22) Filed: Aug. 9, 2004

(65) Prior Publication Data

US 2005/0244080 A1    Nov. 3, 2005

Related U.S. Application Data

(63) Continuation-in-part of application No. 10/836,315, filed on May 3, 2004, now abandoned.

(51) Int. Cl.
*G06K 9/00* (2006.01)
(52) U.S. Cl. .................. 382/154; 382/108; 382/278; 382/291
(58) Field of Classification Search .............. 382/154, 382/108, 278, 291
See application file for complete search history.

(56) References Cited

U.S. PATENT DOCUMENTS

| 5,390,108 | A | * | 2/1995 | Baldur et al. | ............... 702/167 |
| 5,841,894 | A | * | 11/1998 | Horie | ......................... 382/154 |
| 6,505,140 | B1 | * | 1/2003 | Bachrach | .................... 702/166 |

FOREIGN PATENT DOCUMENTS

CA     2207454     8/2000

* cited by examiner

*Primary Examiner*—Matthew C Bella
*Assistant Examiner*—Mike Rahmjoo
(74) *Attorney, Agent, or Firm*—Ogilvy Renault LLP

(57) ABSTRACT

A method and an apparatus to obtain a surface mapping of a ballistic piece of evidence (BPOE) under examination, such as a bullet or a spent cartridge case, that can be used thereafter as a 3D signature for identifying purpose during ballistic test comparison. The method comprises providing a measurement unit adapted to acquire a relief map of the surface of the BPOE and acquiring with the measurement unit the relief map of the surface to thereby obtain the mapping of the surface of the BPOE. Preferably, the measurement unit of the present invention comprises a confocal sensor such as confocal microscope. Also, the present invention includes acquiring the relief map of the bullet surface or of the cartridge case surface by acquiring and assembling a mosaic of regional reliefs that are partly overlapping with their surroundings regional reliefs.

17 Claims, 10 Drawing Sheets

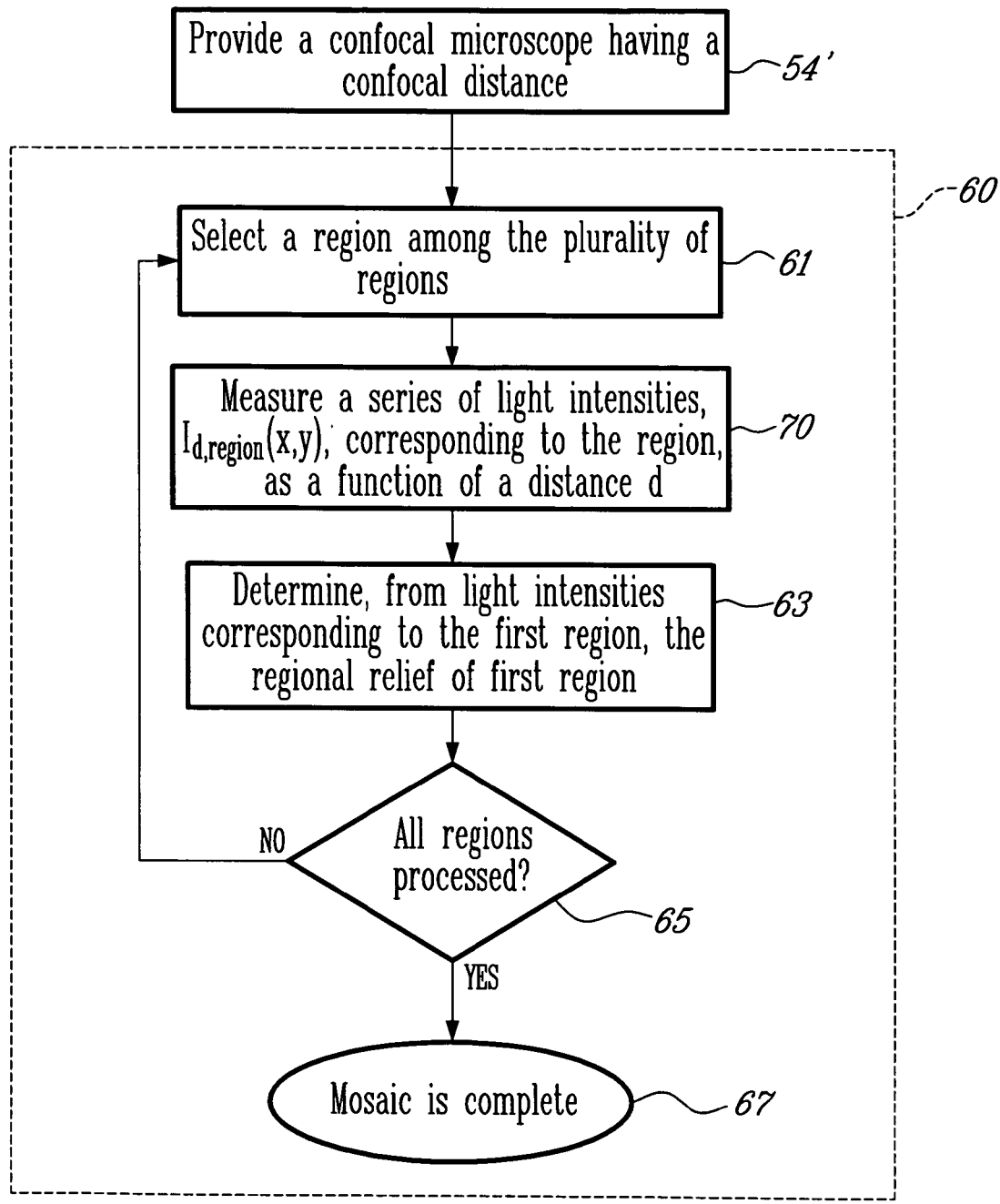

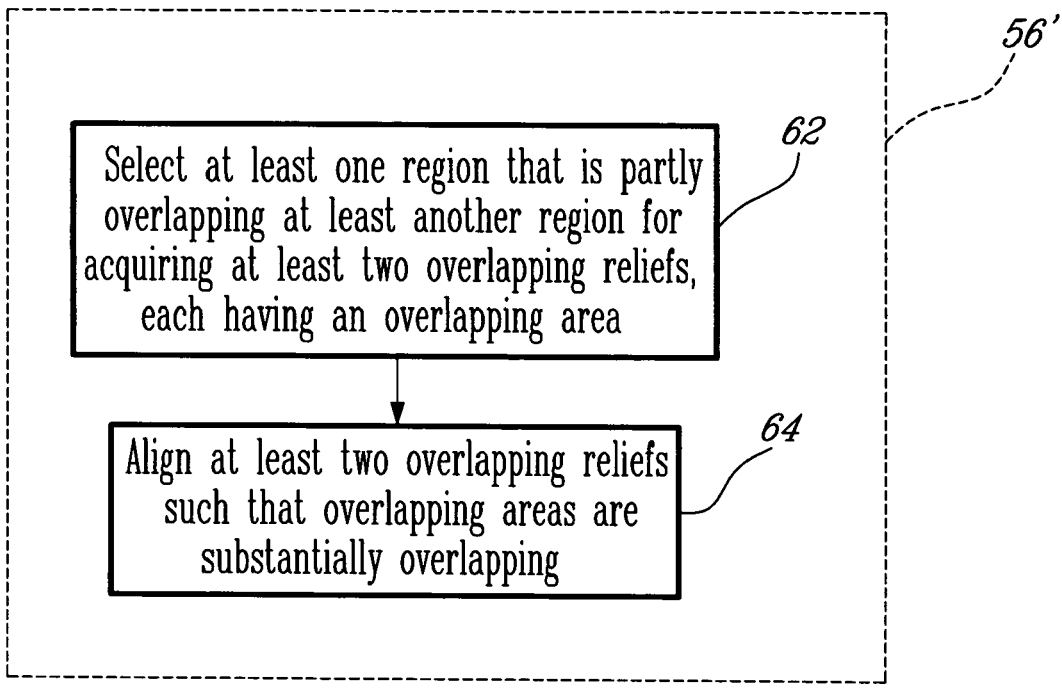

3D BULLET AND CARTRIDGE CASE ANALYSIS

CROSS-REFERENCE TO RELATED APPLICATIONS

This application is a continuation-in-part of U.S. Ser. No. 10/836,315 filed May 3, 2004 now abandoned.

FIELD OF THE INVENTION

The invention relates to a system and a method for the analysis and comparison of ballistic pieces of evidence such as fired bullets and spent cartridge cases. More specially, it relates to a computerized system and method for ballistic piece of evidence (BPOE) analysis based on a 3D imaging of the BPOE surface.

BACKGROUND OF THE INVENTION

In the field of forensic science, investigations of crimes involving firearms use ballistic comparison test to determine if a bullet or a spent cartridge case found on the crime scene has been fired by a firearm in question. Ballistic comparison tests rely on the fact that when a bullet is fired by a firearm, striations are created on the bullet surface and these striations have enough unique features to represent a signature of the firearm. With regards to spent cartridge cases when a firearm is fired unique identifiable features (marks) are impressed or striated onto various areas of the cartridge case. These unique marks are transferred from the firearm to the cartridge case each time the firearm is discharged; these marks also represent the signature of the firearm. Therefore by comparing the striations or impressed characteristics of two bullets or two cartridge cases, it is possible to conclude if they have been fired by the same firearm.

Most existing automatic ballistic comparison systems use 2D imaging techniques to obtain images of the striations or impressed marks on the ballistic piece of evidence (i.e. the bullet or the cartridge case) under test. They then compare these images to other images from a database of known firearms. The firearm that was used to fire the ballistic piece of evidence (BPOE) under test can be identified when a match is obtained between the images of the BPOE under test and the images of the database corresponding to a BPOE fired by the same firearm.

However, ballistic matching techniques based on 2D-imaging present many drawbacks. In particular, it is found that the technique lack robustness: the images resulting from a 2D imaging are very dependent on the exact way the BPOE is illuminated and imaged as well as on the surface conditions of the BPOE, therefore affecting the performance of the technique.

Recently, Bachrach et al. in their U.S. Pat. No. 6,505,140 B1 have proposed to use a confocal technique, also referred to as a 3D-imaging technique, to better study and identify the features of a bullet surface. A confocal sensor enables one to measure the striation structure and this leads to a more reliable way than a 2D-imaging technique to characterize the striations on a bullet surface. However, the striation characteristics are resolved along particular direction of a bullet striation, to obtain what is called a depth profile of the bullet striation. Therefore, although a 3D-imaging technique is used, no real 3D bullet signature is established and used for further ballistic comparison.

SUMMARY OF THE INVENTION

Accordingly, an object of the present invention is to provide a method and an apparatus to obtain a surface mapping of a BPOE under examination that can be used thereafter as a 3D signature for identifying purposes during ballistic test comparison.

More specifically, in an embodiment, the present invention provides a method of mapping a surface of a BPOE. The method comprises acquiring a plurality of regional reliefs, each regional relief corresponding to a region of the plurality of regions, and assembling the plurality of regional reliefs into a mosaic for obtaining a relief map of the surface to thereby obtain a mapping of the surface of the BPOE.

Preferably, the present invention provides a method for acquiring the relief map of the surface of the BPOE by acquiring and assembling a mosaic of overlapping regional reliefs. The method comprises selecting at least one region that is partly overlapping at least another region for thereby acquiring at least two overlapping reliefs, each having an overlapping area; and aligning the at least two overlapping reliefs such that the overlapping areas are substantially overlapping.

Advantageously, the overlapping area of an overlapping relief represents approximately 50% of the surface of the overlapping relief, when the BPOE that is under examination is a bullet.

Advantageously, the overlapping area of an overlapping relief represents approximately 50% of the surface of the overlapping relief, when the BPOE that is under examination is a cartridge case.

Preferably, a confocal sensor is provided to perform the mapping of the surface of the BPOE.

In another preferred embodiment, the present invention provides an apparatus for mapping a surface of a BPOE. The apparatus comprises a holder for holding the BPOE and a measurement unit for measuring a light intensity from the BPOE as a function of a measurement position, wherein the measurement position is a relative position between the BPOE and the measurement unit. The apparatus also comprises a displacement unit for providing a series of different measurement positions and a controller unit to control the displacement unit for mapping the surface of the BPOE.

Preferably, the measurement unit comprises a confocal sensor such as a confocal microscope.

BRIEF DESCRIPTION OF THE DRAWINGS

These and other features, aspects and advantages of the present invention will become better understood with regard to the following description and accompanying drawings wherein:

FIG. 3 is a flow chart detailing the steps of acquiring a mosaic of regional reliefs of FIG. 2B when a confocal microscope is used;

FIG. 6A is an example of a regional relief obtained with the surface mapping method of a bullet in accordance with one embodiment of the present invention;

FIG. 6B is a sectional view taken along cross-section line A-A of FIG. 6A showing the striation structure;

DETAILED DESCRIPTION OF THE INVENTION

We will describe a system for mapping a surface of a BPOE 9. The system can be equally used to map a bullet 12 or to map a spent cartridge case 112.

Figure 1A:
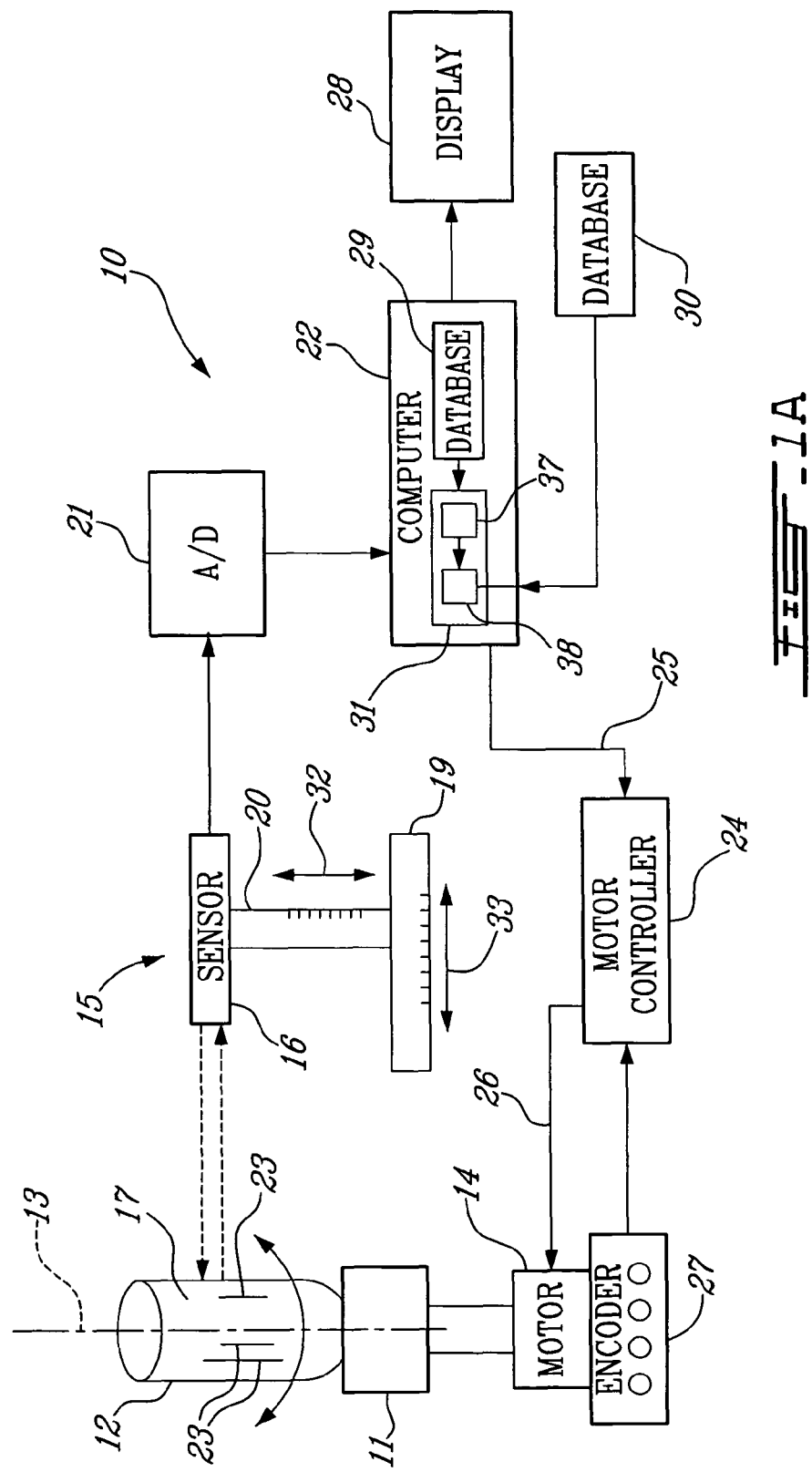
FIG. 1A is schematic view of a computerized system for bullet ballistic analysis based on 3D imaging in accordance with a first embodiment of the present invention.

System for mapping a bullet surface: In a first embodiment of the present invention, a computerized system 10 equipped with a confocal microscope is used to obtain a surface mapping of a bullet. This embodiment is illustrated in FIG. 1A and can be described as follow. The system 10 comprises as the main elements a bullet holder 11 to hold a bullet 12, a confocal microscope sensor 16 to acquire a relief map of a surface 17 of the bullet 12, and a displacement system controlled by a computer 22, to vary the relative position between the bullet 12 and the sensor 16. It is worth mentioning that although, in certain embodiments of the present invention, a confocal microscope is used as the mapping sensor, other sensors could also be used (Moiré, Laser Confocal Scanning Microscopy, Pixel Contrast).

In this first embodiment, the bullet holder can rotate the bullet 12 about the rotation axis 13 shown in FIG. 1A, via a motor 14. Using sensor 16, this rotation movement of the bullet 12 permits the measurement of contiguous regions of the bullet 12 surface 17, to form later on a relief map of a peripheral band of the bullet 12. In this embodiment, a regional relief of a region of the bullet 12 is obtained, and then the bullet 12 is rotated by an angle to present another surface region, that will include a 50% overlap with the previous region, to the field of view of the sensor 16, and so on, until a complete peripheral band is measured. The exact angle of rotation is calculated and is inversely proportional to the bullet caliber. Obviously, other measurement configurations may also be implemented without departing from the scope of this invention.

In this first embodiment, the rotation of the bullet 12 is controlled via the controller 24 which is itself linked to the computer 22. An encoder 27 measures the rotation angle of the bullet 12 and relays this information to the computer for further analysis.

The relative position between the bullet 12 and the sensor 16 is changed by the micro-positioners 19 and 20. One micro-positioner 20 permits the variation of the height of the sensor 16 whereas the other micro-positioner 19 enables to vary the relative distance and tilt between the sensor 16 and the bullet 12. All micro-positioners 19, 20 are controlled by the computer 22 so that a series of measured intensities as a function of a series of distances may be obtained in a controlled manner, and that several such series may be obtained for several different regions of the bullet 12.

In this first embodiment, the confocal microscope 16 comprises an analog to digital converter 21 which relays to the computer 22 the digitalized microscope measurements. The computer 22 is used to control and adjust the parameters of the sensor 16 such as for example the focal distance of the microscope, its field of view, etc. In this first embodiment, the computerized system 10 also comprises a display unit 28 to visualize the measurements and the experiments parameters, and is also linked to a database 29 in which the measurements will be stored. The database 29 also gives access to measurements of other bullets for ballistic comparison studies. An analysis program 37 is used for processing the experimental data of the bullet 12 under examination and a comparison program 38 is used to compare the present bullet 12 relief map to other relief maps found in the database 29. In a preferred embodiment, the methods of the present invention may be embodied in computer 22.

Figure 1B:
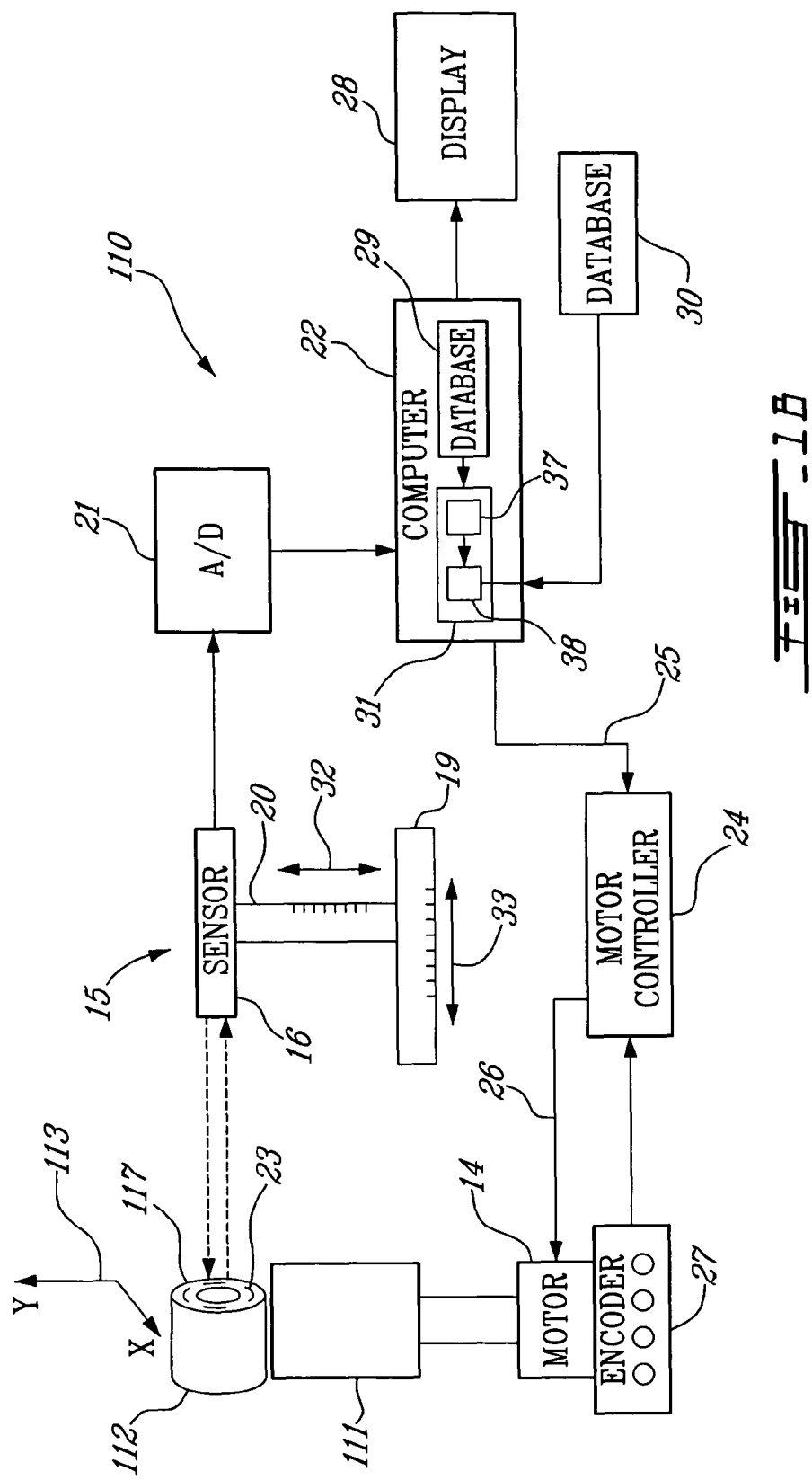
FIG. 1B is schematic view of a computerized system for spent cartridge case ballistic analysis based on 3D imaging in accordance with a second embodiment of the present invention.

System for mapping a cartridge case surface: In a second embodiment, a system 110 similar to system 10 just described, is used to obtain a surface mapping of a spent cartridge case 112. This second embodiment is illustrated in FIG. 1B. The main differences between FIG. 1B and FIG. 1A are related to the ways the cartridge case 112 is held and displaced by system 10 while acquiring the mosaic of relief regions.

In this second embodiment, the cartridge case holder 111 can displace the cartridge case 112 about the X and Y axis shown in FIG. 1B, via two motors 14. Using sensor 16, this displacement of the cartridge case 112 permits the measurement of contiguous regions of the cartridge case 112 surface 117, to form later on a relief map of a composite region of the cartridge case 112. In this second embodiment, a regional relief of a region of the cartridge case 112 is obtained, and then the cartridge case 112 is displaced first in the X direction and then in the Y direction to present another surface region, that will include a 50% overlap with the previous region, to the field of view of the sensor 16, and so on until a complete array of regional reliefs, forming, when assembled, an image of the full head of the cartridge case 112, is obtained. The exact displacement is constant. Obviously, other measurement configurations may also be implemented without departing from the scope of this invention.

In this second embodiment, the rest of the system 110 is the same as for the system 10, and therefore will not be further described.

A surface mapping method: We will now describe in detail a method 50 of mapping a surface of a BPOE 9. The method applies equally well to a bullet 12 or to a cartridge case 112.

Figure 2A:
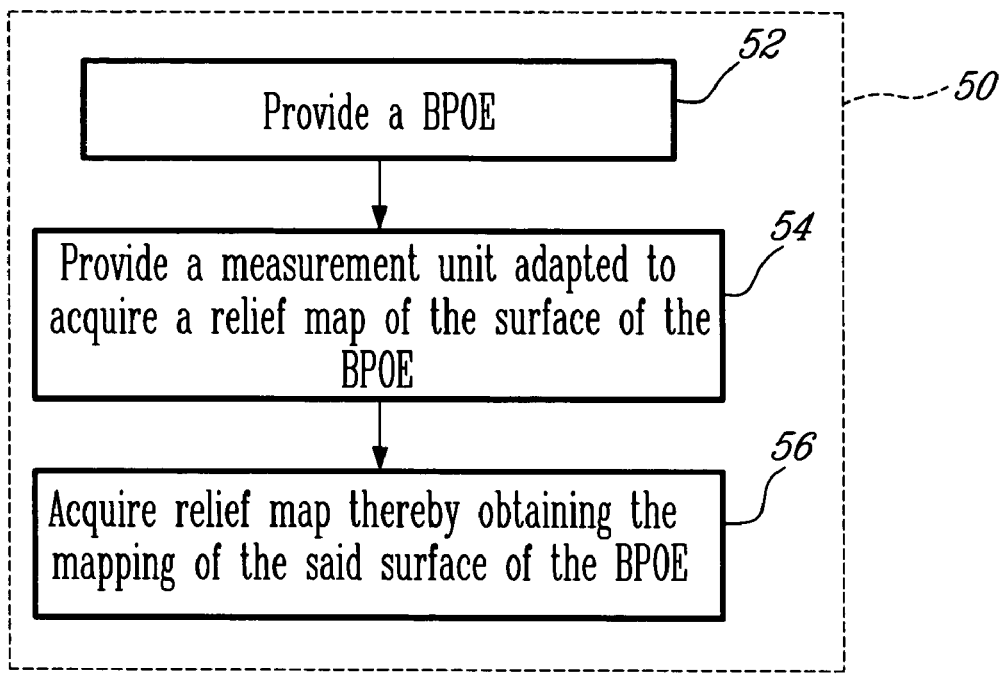
FIG. 2A is a flow chart of a surface mapping method of a bullet in accordance with one embodiment of the present invention.

The main steps of a surface mapping method 50 of a BPOE according to an embodiment of the present invention are listed in FIG. 2A and are described in more detail in the following paragraphs.

A BPOE 9 under examination is provided at step 52 and a measurement unit adapted to acquire a relief map of a surface of the BPOE is provided at step 54. Then, at step 56, the measurement unit acquires the relief map to thereby map the surface of the BPOE 9. In one embodiment, this surface is a peripheral band of a bullet 12 corresponding to a surface region of the bullet 12 expected to contain significant striations 23 produced when the firearm is fired. In another embodiment, this surface corresponds to a surface region of the cartridge case 112 expected to contain significant impressed marks 23 produced when the firearm is fired. Often, but not exclusively, this surface region is located using a 2D-imaging technique, this permits examination of the bullet 12 or the cartridge case 112 prior to the 3D-imaging measurement, in order to identify what surface region of the BPOE 9 contains the striations or impressed marks 23 that should be analyzed with the present invention. In an embodiment, the previously described computerized systems 10 and 112 comprise the measurement unit used in step 54. Thus according to the method 50, a BPOE 9 under examination is installed in the bullet holder 11 of the computerized system 10 (when the BPOE is a bullet) or in the cartridge case holder 111 of the computerized system 110 (when the BPOE is a cartridge case). The interface program 37 embedded in the computer 22 is used to program the sensor 16 measurement parameters, and to control the sensor displacements via the micro-positioners 19, 20. When the BPOE 9 is a bullet 12, the computer 22 also controls the holder rotating motor 14. The computer thus sends a signal to the rotating motor 14 to rotate the bullet 12 until the surface, that has been chosen to be mapped, is in the field of view of the sensor 16, and the encoder 27 sends back a signal to inform the computer of the value of the measurement angle. The computer 22 also sends signals to the micro-positioners 19, 20 to adjust the height of the sensor 16 relatively the bullet 12 via the micro-positioner 20, and a relative distance, d (not shown), between the bullet surface and the sensor 16 via the micro-positioner 19. When the BPOE 9 is a cartridge case 112, the computer 22 controls the transversal displacement unit 113 that permits the displacement of the cartridge case head in the field of view of the sensor 16. The computer sends a signal to transversal displacement unit 113 to displace the cartridge case 112 until the surface, that has been chosen to be mapped, is in the field of view of the sensor 16, and the encoder 27 sends back a signal to inform the computer of the value of the measurement angle. The computer 22 also sends signals to the micro-positioners 19, 20 to adjust the height of the sensor 16 relative to the cartridge case 112 via the micro-positioner 20, and a relative distance, d (not shown), between the cartridge case surface and the sensor 16 via the micro-positioner 19.

Figure 2B:
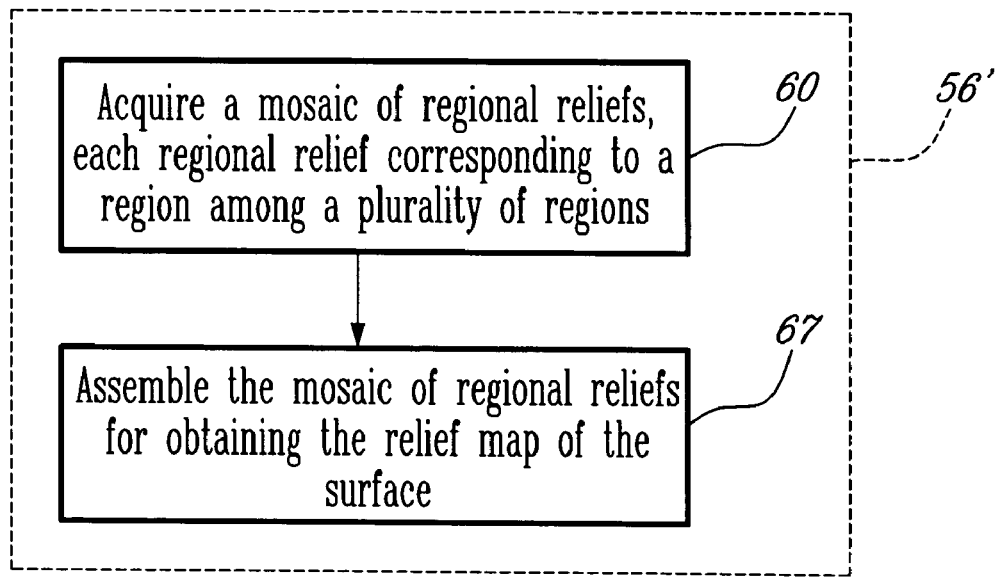
FIG. 2B is a flow chart detailing the steps of acquiring the relief map of FIG. 2A, in the case where a mosaic of regional reliefs is acquired.

Turning now to FIG. 2B, in a preferred embodiment of step 56', a surface region of a BPOE 9 susceptible to contain significant impressions and/or striations 23 is mapped. When the BPOE 9 is a bullet 12, this surface region corresponds to a peripheral band of the bullet surface containing significant striations 23. When the BPOE 9 is a cartridge case 112, this surface corresponds to a full region of the cartridge case head surface containing significant impressions and/or striations. This mapping is performed by acquiring a mosaic of regional reliefs, each regional relief corresponding to a region among a plurality of regions (step 60), where the plurality of regions forms, in the case of a bullet, the peripheral band or forms, in the case of a cartridge case 112, the full region of the cartridge case head surface. Then, at step 67, this mosaic of regional reliefs is assembled for obtaining the relief map of the surface region of a BPOE 9 under examination. This assembling is performed, for example, with the analysis program 37 of the computer 22.

Now referring to FIG. 3, a flow chart details the step of acquiring a mosaic of regional reliefs from FIG. 2B (step 60) when a confocal microscope is used as the measurement unit (step 54'). First, at step 61, a region is selected among the plurality of regions that form the mosaic. Then, at step 70, the system 10 makes a series of measurements with the confocal microscope to obtain a series of light intensities $I_d(x,y)$, corresponding to the selected region as a function of the variable distance d, where d is the distance separating a reference surface of the BPOE 9 and the confocal microscope and where x and y are the surface coordinates of the selected region. This step 70 comprises several intermediate steps that are detailed in FIG. 4 and will be described herein below.

When step 70 is completed for the selected region, the regional relief $z(x,y)$ 80 corresponding to the selected region is determined in step 63 using the well-known analysis principles of the confocal method. The result of this analysis is a regional relief map $z(x,y)$ 80, where z is the depth value at the coordinates (x,y) of the selected region, and this result can be simply stored in the computer 22 for further analysis.

Then, steps 61, 70, and 63 are repeated until the regional reliefs of all the regions of the plurality of regions have been determined, therefore obtaining a complete mosaic of regional reliefs (step 67).

Figure 4:
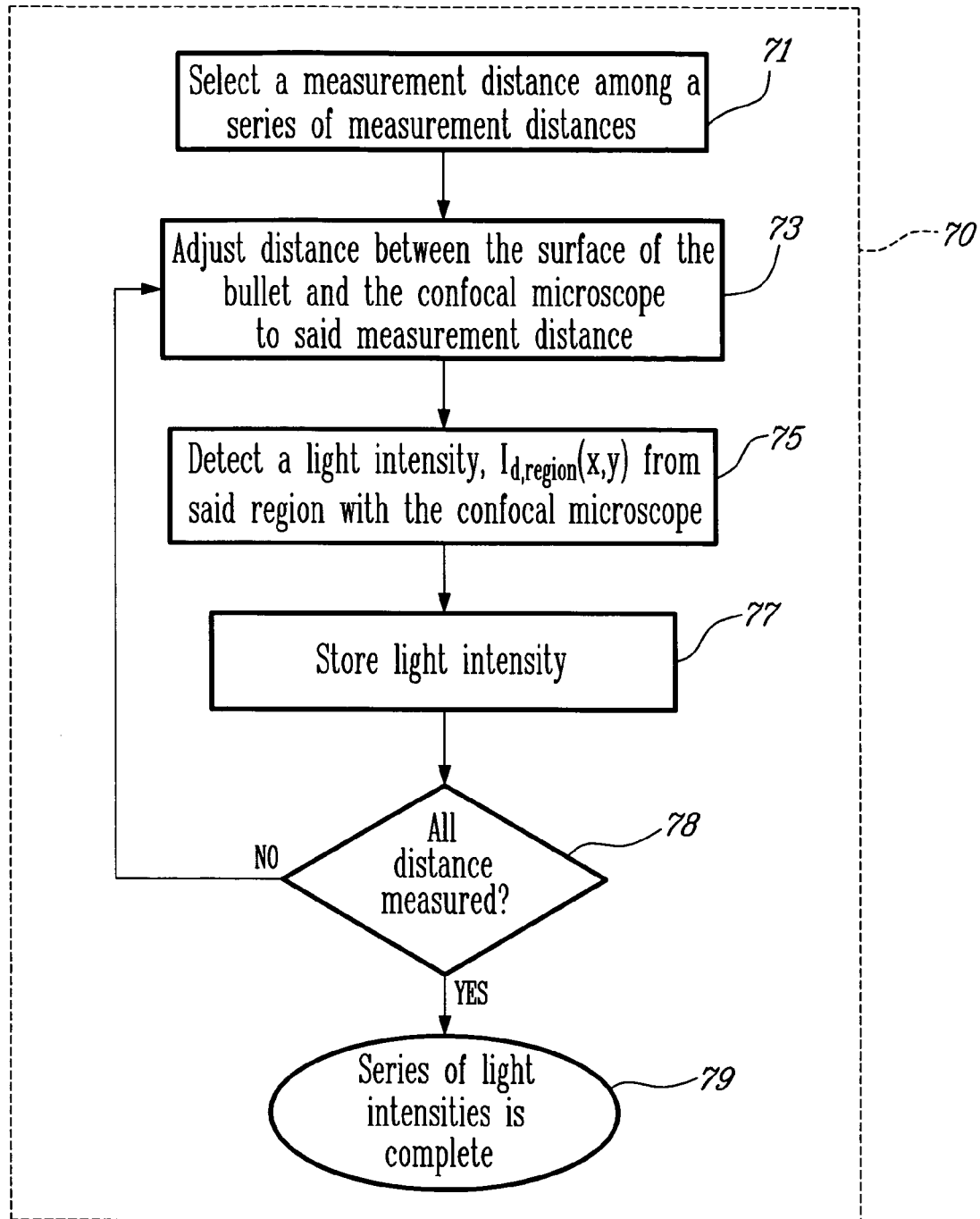
FIG. 4 is a flow chart detailing the steps of measuring a series of light intensities of FIG. 3.

Turning now to FIG. 4, the intermediate steps that are comprised in step 70 of FIG. 3 are detailed. The goal is to measure with the confocal microscope the light intensity distribution, $I_d(x,y)$, for a series of different distances d, where x and y are the surface coordinates of the region under examination. A first distance is selected (step 71) via the computer 22, then the sensor 16 position is adjusted (step 73) accordingly via the micro-positioners 19. Then a first intensity distribution is acquired (step 75) with the sensor 16, digitized, and sent to the computer 22 for storage (step 77). These steps are repeated for all the distances of the series of distances, so that a complete series of light intensities is obtained (step 79).

FIG. 6A is an example of a regional relief 80 of a bullet surface obtained with the surface mapping method just described, where an enlarged striation 23 can be seen. In this preferred embodiment, a regional relief corresponds to a physical area of 1.5 mm×1.5 mm. The regional relief is mapped into an array of 512×512 pixels providing, in an exemplary embodiment, a lateral resolution of approximately 3 microns. Typical depth range of a regional relief depends on the bullet caliber, the firearm and the region. The biggest range would be found on a small caliber on the shoulder area and would be around 50 microns. The smallest range would be found on a .50 caliber in the middle of a groove engraved area and would be around 5 microns. The depth resolution of the sensor is, in an exemplary embodiment, 10 nanometers. Obviously, other physical characteristics of the regional relief can be obtained without departing from the scope of this invention, by tuning the system 10 differently.

FIG. 6B is a sectional view taken along cross-section line A-A of FIG. 6A showing the striation structure 93 along this cross-section line. It can be seen on this figure that this cross-section line possesses profile characteristics and features that can be used as a firearm identification signature.

Figure 8A:
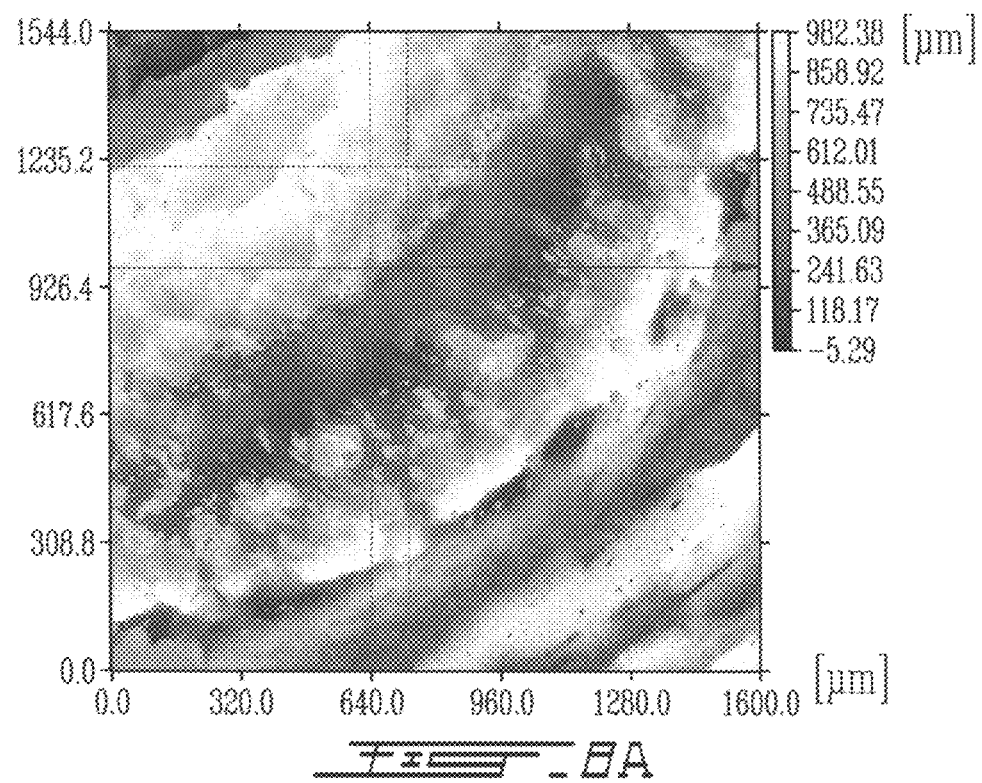
FIG. 8A is an example of a regional relief obtained with the surface mapping method of a cartridge case in accordance with one embodiment.

FIG. 8A is another example, this time of a regional relief 180 of a cartridge case obtained with the surface mapping method just described, where an impression and/or striation 23 can be seen. A regional relief corresponds to a physical area of 1.5 mm×1.5 mm. The regional relief is mapped into an array of 512×512 pixels providing a lateral resolution of approximately 3 microns. Typical depth range of a regional relief depends on the cartridge case caliber, the firearm and the region. The biggest range would be found on a large caliber on the firing ping impression area and would be around 250 microns.

Figure 8B:
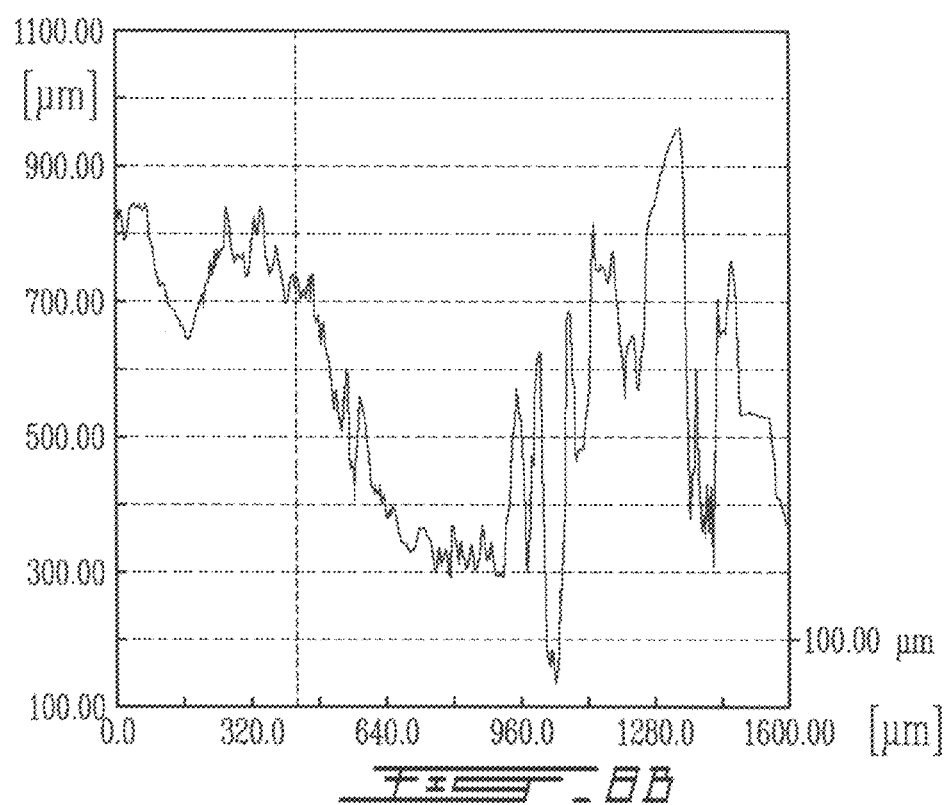
FIG. 8B is a sectional view taken along cross-section line A-A of FIG. 8B showing the striation structure.

FIG. 8B is a sectional view taken along cross-section line AA of FIG. 8A showing the impression and/or striation structure 93, which can be used, as already mentioned, as a firearm identification signature.

Figure 5A:
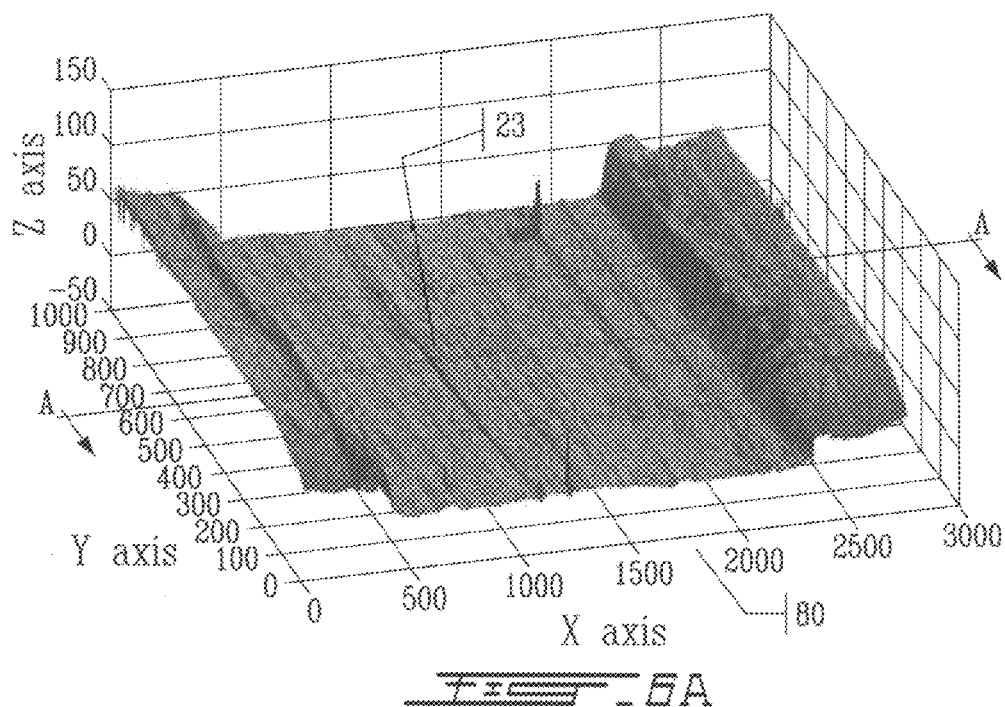
FIG. 5 is a flow chart for a method of acquiring and assembling a mosaic of overlapping reliefs in accordance with one embodiment of the present invention
Figure 5B:
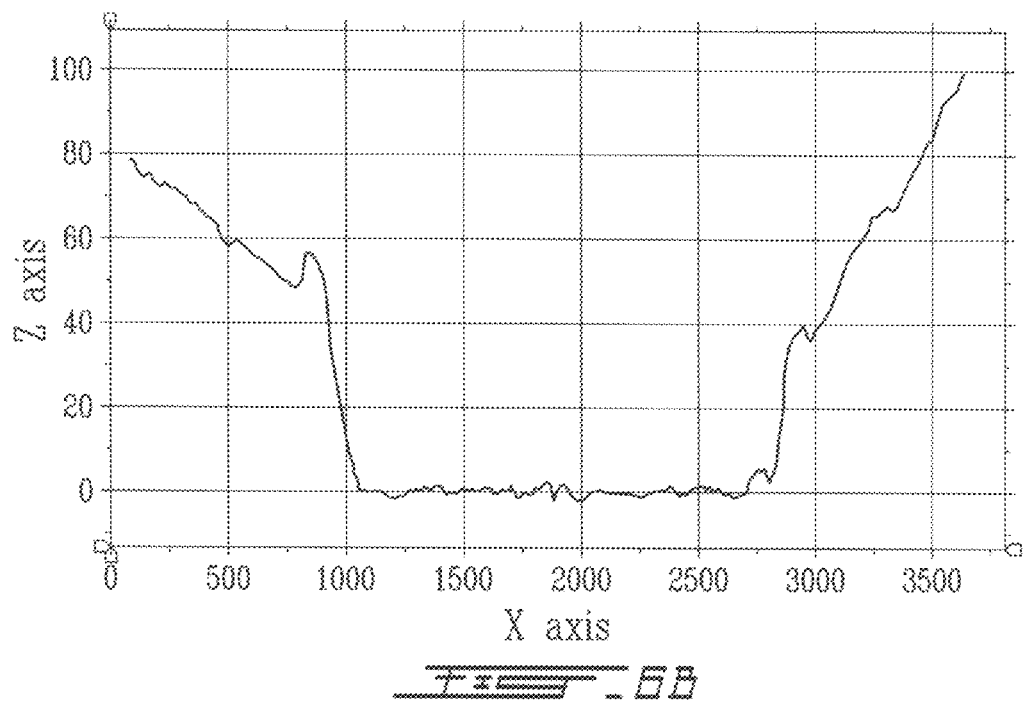

Turning now to FIG. 5, a preferred embodiment of the mapping method 50 comprises acquiring a mosaic of overlapping reliefs 56', each overlapping relief corresponding to an overlapping region among a plurality of overlapping regions, wherein each overlapping relief has at least one overlapping area in common with an overlapping area of another overlapping relief (step 62). The advantage of acquiring overlapping reliefs (partly overlapping) is that they can be more easily aligned when comes the time to assemble them to form the final image of the BPOE. This assembling can be performed by finding the best overlapping degree between overlapping areas that are in common (step 64).

It is worth mentioning that the relief maps may suffer of distortions due, for example, to the curved surface of the bullet. The present invention provides an algorithm correcting these distortions effects in order to eliminate such distortion in the final assembling step. Also other distortion effects due to optical effects or due to misalignment measurement errors are also corrected via the algorithm provided by the present invention.

Figure 7:
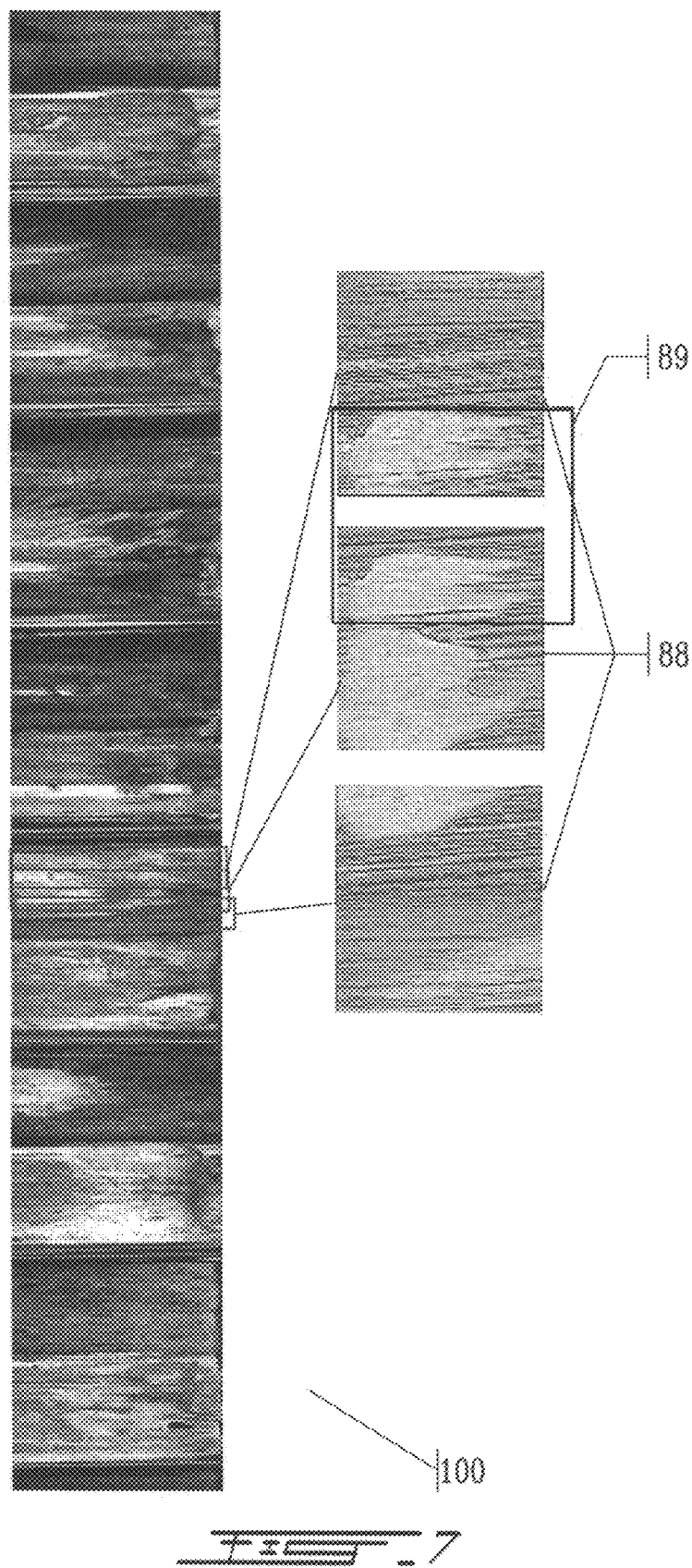
FIG. 7 is an example of a mosaic of overlapping reliefs, after they have been overlapped using the surface mapping method of a bullet in accordance with one embodiment of the present invention.

FIG. 7 gives an example of a peripheral band 100 of a bullet 12 that was formed by a mosaic of aligned overlapping reliefs 88 where an exploded close-up of three consecutive overlapping reliefs of the mosaic is shown. As can be seen, each overlapping relief 88 has at least one overlapping area 89 in common with an overlapping area 89 of another overlapping relief. In this example, the overlapping areas 89 are chosen such that each of the overlapping regions of this mosaic overlaps its neighbor regions by about 50%. Naturally other overlapping degree could also vary without departing from the scope of this invention.

Figure 9:
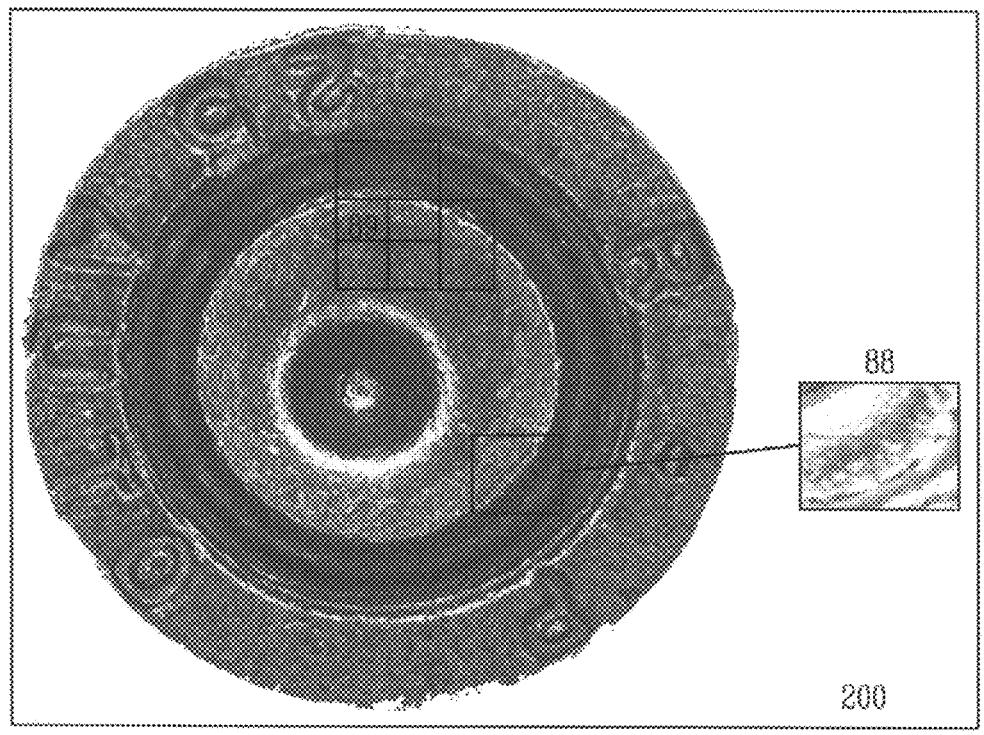
FIG. 9 is an example of a mosaic of overlapping reliefs, after they have been overlapped using the surface mapping method of a cartridge case in accordance with one embodiment of the present invention.

FIG. 9 gives an example of surface array 200 of a cartridge case 112 that was formed by a mosaic of aligned overlapping reliefs 88. As can be seen, each overlapping relief 88 has at least one overlapping area 89 in common with an overlapping area 89 of another overlapping relief. In this example for a cartridge case head, the overlapping areas 89 are chosen such that each of the overlapping regions of this mosaic overlaps with its neighbor regions by about 50%. Naturally other overlapping degree could also be varying without departing from the scope of this invention.

It will be understood that numerous modifications methods and apparatus described herein will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure that come within known or customary practice within the art to which the invention pertains and as may be applied to the essential features herein before set forth, and as follows from the scope of the appended claims.

What is claimed is:

1. A method of mapping a surface of a ballistic piece of evidence (BPOE), wherein said surface of the BPOE comprises a plurality of regions, the method comprising:

acquiring a plurality of z(x,y) regional reliefs each comprising a measured surface with corresponding depth values z, where (x,y) are surface coordinates of the measured surface, each z(x,y) regional relief corresponding to a three-dimensional measurement of one of said plurality of regions, said acquiring comprising obtaining multiple two-dimensional light intensity images of said measured surface at different heights to provide said depth values z;

removing from said z(x, y) regional reliefs distortions due to a curved surface of the BPOE;

assembling said plurality of regional reliefs into a mosaic for obtaining a relief map of said surface, thereby obtaining the 3-dimensional mapping of said surface of the BPOE;

providing a user with said relief map of said surface; and also providing said user with a two-dimensional light intensity image as complementary information to said relief map of said surface, said two-dimensional light intensity image having been acquired with a same set of x,y coordinates as said plurality of regional reliefs.

2. The method as claimed in claim 1, further comprising selecting at least one region that is partly overlapping at least another region for thereby acquiring at least two overlapping reliefs, each having an overlapping area.

3. The method as claimed in claim 2, wherein said overlapping area of an overlapping relief represents approximately 50% of a surface of said overlapping relief.

4. The method as claimed in claim 2, further comprising aligning said at least two overlapping reliefs such that said overlapping areas cover a substantial portion of a total area of each one of said two overlapping reliefs.

5. The method as claimed in claim 4, wherein said surface comprises a selected portion of the surface of said BPOE thereby obtaining the mapping of a selected portion of the surface of said BPOE.

6. The method as claimed in claim 5, wherein said acquiring a plurality of regional reliefs comprises measuring said regional reliefs with a confocal technique.

7. The method as claimed in claim 6, wherein said acquiring comprises setting a position of the BPOE, prior to said measuring, to a measured position corresponding to one region among said plurality of regions.

8. The method as claimed in claim 7, wherein said acquiring comprises correcting distorting effects in regional reliefs to compensate for an imperfect positioning of the BPOE.

9. The method as claimed in claim 8, wherein said BPOE comprises a cartridge case and wherein said surface comprises a head of the cartridge.

10. The method as claimed in claim 9, wherein said setting a position of the cartridge case comprises calculating a transversal displacement by which the cartridge case is displaced after a regional relief is acquired.

11. The method as claimed in claim 8, wherein said BPOE comprises a bullet and wherein said surface comprises a peripheral band on the bullet.

12. The method as claimed in claim 11, wherein said setting a position of the bullet to a measured position comprises calculating a rotation angle by which the bullet is rotated after a regional relief is acquired.

13. The method as claimed in claim 11, wherein said acquiring comprises correcting distorting effects in regional reliefs to compensate for an off-axis rotation of the bullet.

14. The method as claimed in claim 1, wherein said surface comprises a selected portion of the surface of said BPOE thereby obtaining the mapping of a selected portion of the surface of said BPOE.

15. The method as claimed in claim 14, wherein said acquiring a plurality of regional reliefs comprises providing said BPOE.

16. The method as claimed in claim 15 wherein said acquiring a plurality of regional reliefs comprises measuring said regional reliefs using a measurement unit adapted for said mapping.

17. The method as claimed in claim 16, wherein said acquiring a plurality of regional reliefs comprises measuring said regional reliefs with a confocal technique.

* * * * *